United States Patent [19]
Piscitelli

[11] Patent Number: 4,742,607
[45] Date of Patent: May 10, 1988

[54] TRANSMISSION DISASSEMBLY TOOL AND METHOD

[76] Inventor: John A. Piscitelli, 126 Key Dr. South, Hallandale, Fla. 33009

[21] Appl. No.: 37,077

[22] Filed: Apr. 13, 1987

Related U.S. Application Data

[63] Continuation of Ser. No. 848,768, Apr. 7, 1986, abandoned.

[51] Int. Cl.4 .......... B23P 19/04
[52] U.S. Cl. .......... 29/226; 29/227; 29/267
[58] Field of Search .......... 29/225–229, 29/267, 251, 283; 269/901; 100/293

[56] References Cited

U.S. PATENT DOCUMENTS

| | | | |
|---|---|---|---|
| 3,099,875 | 8/1963 | Lelis | 29/227 |
| 3,871,055 | 3/1975 | Dail | 29/226 |
| 3,949,459 | 4/1976 | Marenchin | 29/226 |
| 4,378,107 | 3/1983 | Wagster | 269/901 |

*Primary Examiner*—Robert C. Watson
*Attorney, Agent, or Firm*—Herbert L. Lerner; Laurence A. Greenberg

[57] ABSTRACT

A transmission disassembly tool, for compressing springs biasing a retainer against a snap ring disposed on a hub within a rear piston casing of a transmission includes a rod passing through the hub and extending above and below the hub, a cap disposed on the retainer, a device for locking the cap on the rod above the hub, a pedal, a device for detachably connecting the foot pedal to the rod below the hub, and a device for pivotally attaching the pedal to any substantially vertical surface, whereby depression of the pedal pulls the retainer away from the snap ring, and a method for operating the tool.

9 Claims, 1 Drawing Sheet

TRANSMISSION DISASSEMBLY TOOL AND METHOD

This application is a continuation of application Ser. No. 848,768, filed Apr. 7, 1986, now abandoned.

The invention relates to a transmission disassembly tool and method for removing the snap ring from the hub or shaft in the rear piston casing of automatic transmissions.

Automatic transmissions for automobiles have an outer casing and a rear piston casing within the outer casing which are sealed to each other by O-rings. A hub or shaft which is integral with the outer casing extends into the inner casing. The hub has a snap ring thereon which is biased by a retainer that is in turn pushed against the retainer by several springs. When such a transmission is repaired, it is necessary to change the seals. This can only be done by removing the rear piston casing from the outer casing, which in turn requires the removal of the snap ring.

A rear clutch tool produced by the firm Trans-tool Corp under model Nos. T 150, 151 and 152 may be used for the manual removal of the snap ring. However, a great deal of strength is required to compress the springs bearing against the retainer and another member must be provided above the snap ring against which the tool can be supported for compressing the springs. Such an additional member and the tool itself, also make it difficult for the operator of the tool to reach the snap ring.

U.S. Pat. No. 3,871,055 describes a foot actuated press which may be used to compress springs in clutches and automatic transmissions. However, that device is a one-piece unit which is bulky and heavy and must be bolted to the floor, making the device difficult to move from place to place. The device includes a plate onto which the entire transmission must be placed. Additionally, the height of the plate is fixed, regardless of the height of the transmission being repaired. Therefore, if a large transmission is being worked on, it is impossible for one operator to look down into the transmission and remove the snap ring, while simultaneously stepping on the foot pedal to remove the pressure from the snap ring.

It is accordingly an object of the invention to provide a transmission disassembly tool which overcomes the hereinaforementioned disadvantages of the heretofore-known devices of this general type, which is easily transportable, is not one-piece, can be operated without being permanently installed and can be assembled on the transmission, instead of requiring the transmission to be placed on the tool, as in the prior art devices.

With the foregoing and other objects in view there is provided, in accordance with the invention, a transmission disassembly tool, for compressing springs biasing a retainer against a snap ring disposed on a hub within a rear piston casing of a transmission, comprising a rod passing through the hub and extending above and below the hub, a cap disposed on the retainer, means for locking the cap on the rod above the hub, a foot or hand pedal, means for detachably connecting the foot or hand pedal to the rod below the hub, and means for pivotally attaching the foot or hand pedal to any substantially vertical surface, whereby depression of the foot or hand pedal pulls the retainer away from the snap ring.

As long as the transmission is somewhat above the ground, the rod is merely slipped into the hub from above and the foot or hand pedal is hooked on. Since the foot or hand pedal is detachably connected to the rod, it can be swung out of the way after the snap ring is removed, allowing the rod to be removed from the hub from the top. The disassembly tool is therefore completely removed from the transmission without having to move the much heavier transmission.

In accordance with another feature of the invention, the foot or hand pedal is a bar, and the detachable connecting means are in the form of a hook pivotally connected to the bar.

In accordance with a further feature of the invention, the rod has a lower end with an eye formed therein into which the hook is engaged, and the foot or hand pedal includes a tension spring pulling the hook toward the bar when not engaged in the eye. In this way, the hook will snap back against the bar, out of engagement with the rod by simply lifting the bar.

In accordance with an additional feature of the invention, the cap includes two arcuate portions and a central portion interconnecting the arcuate portions, the arcuate portions being mutually spaced apart providing access to the snap ring. It is important to provide as much access opening as possible since snap ring removal pliers must be used to remove the snap ring.

In accordance with yet an added feature of the invention, there is provided a magnet attached to a lower surface of the cap for retaining the snap ring. In this way, the snap ring will be held by the magnet after it is removed so that it cannot fall into the rear piston casing. Furthermore, when inserting a new snap ring, it can be placed against the magnet before placing the cap on the retainer, so that it is automatically located near the portion of the hub on which it is to be disposed.

In accordance with still another feature of the invention, there is provided a stand having an open front and upper and rear surfaces, the upper surface having a hole formed therein for receiving a lower portion of the hub and the rod, and the rear surface having another hole formed therein, the pivotal attaching means including a fastener passing through the other hole for pivotally attaching the foot or hand pedal to the stand. However, the fastener can be attached to any vertical surface such as a pole, a wall or an old outer transmission casing which is often used as a stand.

In accordance with still a further feature of the invention, there is provided a hook attached to the stand for retaining the foot or hand pedal in a depressed condition. By hooking the pedal in the depressed condition, the operator of the tool may walk away from the pedal to the other side of the transmission while the retainer is still removed from the snap ring. This may be necessary in order to remove the snap ring.

In accordance with still an additional feature of the invention, there is provided a shelf having a hole formed therein for receiving a lower portion of the hub and the rod, and means for attaching the shelf to a column at any desired height. A shelf is particularly convenient since it may be disposed at any height.

In accordance with again a further feature of the invention, the column is attached below a working surface of a table on which a portion of an outer casing surrounding the rear piston casing is supported. Front wheel drive transmissions have an arm projecting radially outwardly, which must be supported while repairing the transmission. This arm can be supported on the working surface of the table.

With the objects of the invention in view, there is also provided a method for compressing springs biasing a retainer against a snap ring disposed on a hub within a rear piston casing of a transmission, which comprises locking a cap on a rod, passing the rod through the hub from above into a position in which it extends above and below the hub and the cap is disposed on the retainer, connecting a foot or hand pedal to the rod below the hub, pivotally attaching the foot or hand pedal to a substantially vertical surface, and depressing the foot or hand pedal for pulling the retainer away from the snap ring.

In accordance with another mode of the invention, there is provided a method, which comprises attaching the snap ring to a lower surface of the cap with a magnet.

In accordance with a concomitant mode of the invention, there is provided a method, which comprises retaining the foot or hand pedal in a depressed condition with a hook.

Other features which are considered as characteristic for the invention are set forth in the appended claims.

Although the invention is illustrated and described herein as embodied in a transmission disassembly tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
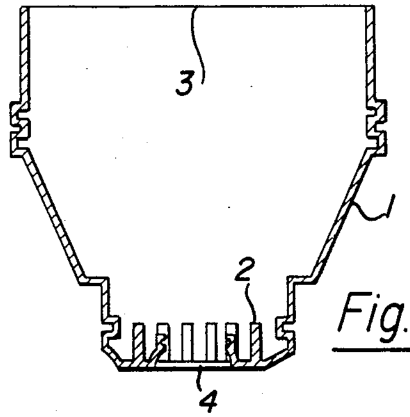
FIG. 1 is a diagrammatic cross-sectional view of a piston case of a transmission.

Referring now to the figures of the drawings in detail, in which elements of the transmission are given reference numerals below 100 and elements of the invention are given reference numerals above 100 and first, particularly, to FIG. 1 thereof, there is seen a cross-sectional view of a rear or reverse piston case or casing of an automatic transmission for an automobile. The case has an opening 3 at the top thereof and an opening 4 at the bottom thereof. Surrounding the opening 4 are posts 2 for receiving compression springs. Ten or more of such posts are normally disposed along an imaginary circle around the opening 4.

Figure 2:
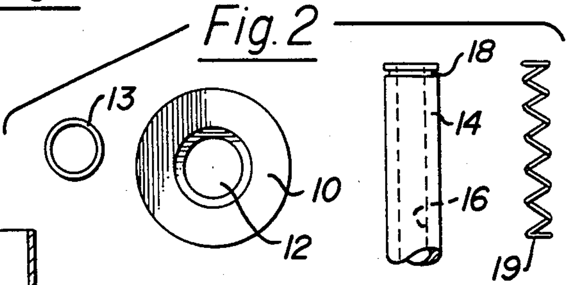
FIG. 2 is an elevational view of several parts of the transmission.
Figure 3:
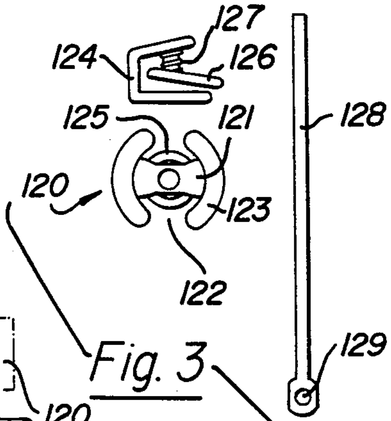
FIG. 3 is an elevational view of several parts of the disassembly device of the invention.

The compression springs 19 are seen in FIG. 2. Also seen in FIG. 2 are a hub 14, a rear spring retainer 10 and a snap ring 13 of the transmission. FIG. 3 shows a rod 128, a cap 120 and a locking device 124 of the disassembly tool according to the invention.

Figure 5:
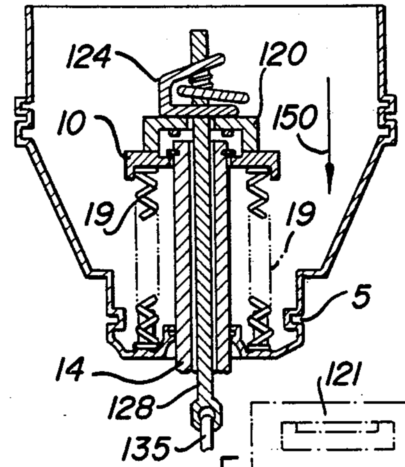
FIG. 5 is a fragmentary, cross-sectional view of the assembled piston case and disassembly tool.

FIG. 5 shows the elements of FIGS. 1–3, in the assembled condition. When the piston case 1 is removed from the transmission, the hub 14 which is integral with the outer casing of the transmission, passes through the opening 4 at the bottom of the piston case and the snap ring 13 is disposed in an annular recess 18 formed in the hub. The hub is in the form of a tube having a channel 16 therein. The bottom of the hub 14 which is not shown in FIG. 5 is integral with the outer casing of the transmission which surrounds the piston case 1. A rear spring retainer 10 is pushed upward against the snap ring 13 by the compression springs 19 extending between the posts 2 and the rear spring retainer 10. It can be seen that the large number of springs 19 will push upward against the snap ring with a great deal of force. Only two springs 19 have been shown in FIG. 5 for the sake of clarity.

Figure 7:
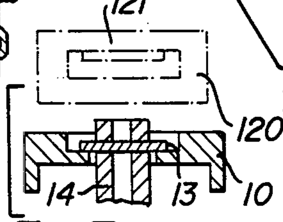
FIG. 7 is a fragmentary, cross-sectional view of a portion of FIG. 5 on an enlarged scale.

FIG. 7 shows the condition of the hub, snap ring and rear spring retainer before the device of the invention is applied. FIG. 7 also shows the cap 120 of the invention in phantom, before it is lowered onto the rear spring retainer 10.

O-rings are disposed in recesses 5 formed in the piston case 1, for sealing the piston case to the outer transmission casing. When repairing the automatic transmission, the O-rings in the recesses 5 must be replaced. The O-rings can only be replaced when the piston case 1 is removed from the outer transmission casing. However, the hub which is integral with the outer transmission casing is connected to the piston case 1 by the snap ring 13, spring retainer 10 and springs 19. In order to remove the snap ring, the cap 120 is placed on the rod 128 and the locking device 124 is placed above the cap 120. This is accomplished by lifting a lever 126 of the device 124 against the force of a compression spring 127. When releasing the lever 126, the spring 127 locks the device 124 against the rod 128 so as to fix the cap 120 firmly against the rear spring retainer 10. The rod 128 is then inserted through the hub 14 from the top so that an eye 129 extends below the bottom of the hub. After the rod 128 is in place, the cap 120 rests on top of the rear spring retainer 10 and the locking device is above the cap.

Figure 4:
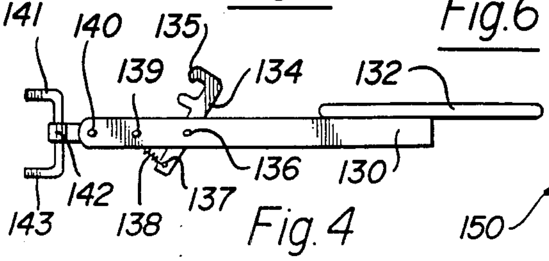
FIG. 4 is an elevational view of the foot or hand pedal of the invention.

The foot or hand pedal 130 shown in FIG. 4 includes a plate 132 on which pressure is exerted by the foot or hand of the operator. The pedal 130 is pivoted on a bracket 142 by a pin 140. The bracket 142 is firmly connected to a U-shaped holder having screw threads 143. A latch 134 is pivoted on the pedal 130 by a pin 136. The pedal 130 may be formed of two pieces, between which the latch 134 may be disposed. The latch 134 includes a hook 135 which can allow the latch 134 to grip the eye 129 of the rod 128 as shown at the bottom of FIG. 5. Finally, the latch 134 is held in the position shown in FIG. 4 by a tension spring 138 connected between pins 137 and 139.

Figure 6:
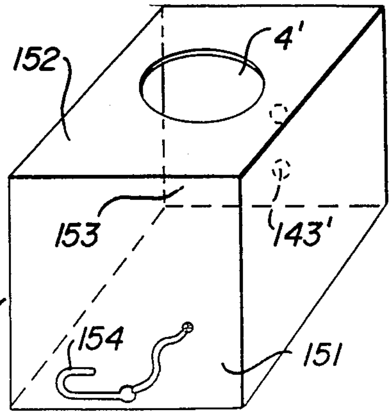
FIG. 6 is a perspective view of the transmission stand according to the invention.

FIG. 6 shows a transmission stand 150 which is about 18 inches high, having an open front 151. A hole 4′ is formed in the upper surface 152 of the stand 150. The hole 4′ is larger than the hole 4 in the piston case 1 but smaller than the lower surface of the piston case. Finally, holes 143′ are formed in the rear surface 153 of the stand 150.

The screw threads 143 of the pedal are pushed through the openings 143′ in the surface 153 and nuts are placed on the screw threads to lock the holder 141 in place. Most of the pedal 130 is, therefore, disposed inside the stand 150, but the plate 132 extends outward through the opening 151.

In order to operate the disassembly device of the invention, the piston case 1 is placed on top of the transmission stand 150 so that the holes 4 and 4' are substantially concentric. The piston case includes the hub 14, the springs 19, the rear spring retainer 10 and the snap ring 13 of the transmission, as well as the rod 128, the cap 120 and the locking device 124 of the invention, when it is placed on the stand 150.

The latch 134 is pushed manually toward the surface 153 while lifting the pedal 130 so that the hook 135 engages the eye 129, as shown in FIG. 5. The operator then steps on the plate 132 which pulls the rod 128 along with the locking device 124 and the cap 20 downward in the direction of the arrow 150 against the force of the springs 19, so that the rear spring retainer 10 is pushed below the snap ring 13. In the position shown in FIG. 5, the retainer 10 has already been slightly lowered from the position shown in FIG. 7. The operator can then easily place his hand or hand tools through spaces 122 between the cross piece 121 and the outer ring 123 of the cap 120, so that the snap ring 13 may be removed. The outer ring 123 is formed of two arcuate pieces being mutually spaced apart providing the greatest access to the snap ring. This allows snap ring removal pliers to be placed in the spaces 122. The operator then releases the plate 132 and allows the rear spring retainer 10 to move above the hub 14. After the casing 1 is removed, the O-rings are replaced and the casing is replaced, the tool is used to depress the retainer again so that a new snap ring can be added. It is also possible to place a hook 154 around the pedal 130 so that the spring retainer will remain separated from the snap ring 13 when the operator walks away or moves to another side of the stand.

Figure 8:
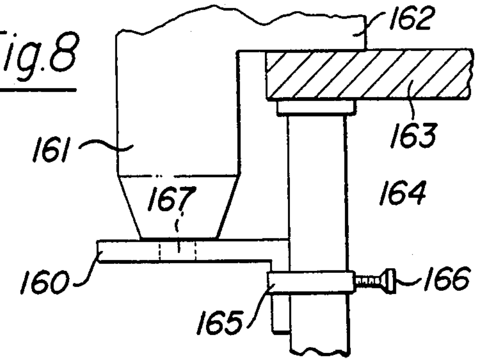
FIG. 8 is a fragmentary, elevational and partly cross-sectional view of a shelf on a column attached below a surface of a table for supporting a transmission.

FIG. 8 shows an alternative to the embodiment shown in FIG. 6. In FIG. 8, a shelf 160 having a hole 167 therein, is attached to a column 164 by a bracket 165 and a screw 166. The column 164 is attached to a table 163 having a working surface thereon. Naturally, the shelf could be attached to any post. However, when repairing front wheel drive transmissions 161, which have an arm 162 protruding laterally therefrom, the arm can rest on the working surface of the table 163 if the column 164 is attached to a table. When the operator of the device or the rebuilder of the transmission is finished, the transmission is removed and the shelf is simply swung bolow the table. The rod 128 is then inserted through the top of the transmission 161 and the hole 167 and the foot or hand pedal 130 is hooked on from below. The holder 141 may be connected through non-illustrated holes in the column 164. It should also be noted that the holder 142 can be screwed to any substantially vertical surface, such as a pole or a wall.

FIG. 3 illustrates an annular magnet 125 disposed below the cross piece 121 of the cap 120. When the snap ring is removed, it will adhere to the magnet so that it is removed with the cap. When putting a new snap ring on the hub, it is first placed against the magnet 125 so that it is in position when the cap is placed on the retainer 10.

I claim:

1. Transmission disassembly tool, for compressing springs biasing a retainer against a snap ring disposed on a hub within a rear piston casing of a transmission, comprising a surface for supporting the rear piston casing, a rod having a lower free end smaller than the inside diameter of the hub to be passed through the hub from above with the rear piston casing supported on said surface, so that said rod extends above and below the hub, a cap disposed on the retainer, means for locking said cap on said rod above the hub, a pedal separate from said rod, means for detachably connecting said pedal to said lower free end of said rod below the hub after said rod is passed through the hub from above, and means for pivotally attaching said pedal to any substantially vertical surface, whereby depression of said pedal pulls the retainer away from the snap ring.

2. Transmission disassembly tool according to claim 1, wherein said pedal is a bar, and said detachable connecting means are in the form of a hook pivotally connected to said bar.

3. Transmission disassembly tool according to claim 2, wherein said lower free end of said rod has an eye formed therein into which said hook is engaged, and said pedal includes a tension spring pulling said hook toward said bar when not engaged in said eye.

4. Transmission disassembly tool, for compressing springs biasing a retainer against a snap ring disposed on a hub within a rear piston casing of a transmission, comprising a rod passing through the hub and extending above a below the hub, a cap disposed on the retainer, means for locking said cap on said rod above the hub, a pedal, means for detachably connecting said pedal to said rod below the hub, and means for pivotally attaching said pedal to any substantially vertical surface, whereby depression of said pedal pulls the retainer away from the snap ring, said cap including two arcuate portions and a central portion interconnecting said arcuate portions, said arcuate portions being mutually spaced apart providing access to the snap ring.

5. Transmission disassembly tool according to claim 4, including a magnet attached to a lower surface of said cap for retaining the snap ring.

6. Transmission disassembly tool according to claim 1, including a stand having an open front, an upper surface forming said surface for supporting the rear piston casing, and a rear surface, said upper surface having a hole formed therein for receiving a lower portion of the hub and said rod, and said rear surface having another hole formed therein, said pivotal attaching means including a fastener passing through said other hole pivotally attaching said pedal to said stand.

7. Transmission disassembly tool according to claim 6, including a hook attached to said stand for retaining said pedal in a depressed condition.

8. Transmission disassembly tool according to claim 1, wherein said surface is a shelf having a hole formed therein for receiving a lower portion of the hub and said rod, and including means for attaching said shelf to a column at any desired height.

9. Transmission disassembly tool, for compressing springs biasing a retainer against a snap ring disposed on a hub within a rear piston casing of a transmission, comprising a rod passing through the hub and extending above and below the hub, a cap disposed on the retainer, means for locking said cap on said rod above the hub, a pedal, means for detachably connecting said pedal to said rod below the hub, means for pivotally attaching said pedal to any substantially vertical surface, whereby depression of said pedal pulls the retainer away form the snap ring, a shelf having a hole formed therein for receiving a lower portion of the hub and said rod, and means for attaching said shelf to a column at any desired height, said column being attached below a working surface of a table on which a proriton of an outer casing is supported.

* * * * *